United States Patent [19]

Workman

[11] 3,966,995

[45] June 29, 1976

[54] COFFEE SUBSTITUTE

[76] Inventor: Ruth A. Workman, 2109 Dymond St., Burbank, Calif. 91505

[22] Filed: Aug. 28, 1975

[21] Appl. No.: 608,449

[52] U.S. Cl. ............................ 426/596; 426/615
[51] Int. Cl.² ...................................... A23F 1/14
[58] Field of Search .......... 426/590, 594, 655, 615, 426/599, 464, 482, 596

[56] References Cited
UNITED STATES PATENTS

| | | | |
|---|---|---|---|
| 1,056,111 | 3/1913 | Montgomery | 426/590 |
| 1,150,733 | 8/1915 | Barnhard | 426/655 X |

FOREIGN PATENTS OR APPLICATIONS

| | | | |
|---|---|---|---|
| 550,992 | 2/1943 | United Kingdom | 426/466 |

OTHER PUBLICATIONS

"The Chemistry and Technology of Food and Food Products" 2nd edition, edited by M. B. Jacobs, published by Interscience Publishers Inc., N.Y., 1951 pp. 1289–1294.

*Primary Examiner*—Frank W. Lutter
*Assistant Examiner*—N. Greenblum
*Attorney, Agent, or Firm*—Theodore H. Lassagne

[57] ABSTRACT

The outer zone or cortex of carrot root, separated from the central zone of wood and pith, is subdivided and roasted, providing a material useful for brewing a beverage simulating coffee and devoid, even when brewed, of identifiable carrot odor.

2 Claims, No Drawings

COFFEE SUBSTITUTE

BACKGROUND OF THE INVENTION

1. Field of the Invention

My invention relates to beverages of the kind prepared by infusing materials of vegetable origin, and more particularly to coffee substitutes.

2. Description of the Prior Art

Because of its physiological effects and cost, a number of substitutes for coffee have been developed. Generally, materials of vegetable origin modified by roasting have been employed for such purposes.

Objectionable features of all such materials of which I have any knowledge are, first, their failure to closely simulate in the brewed beverage the flavor of coffee, and, second, the giving off of an odor during brewing and in the brewed beverage which is uncharacteristic of coffee and suggestive of the source material.

The primary object of my invention is the provision of a material for brewing a beverage simulating coffee which is devoid even during brewing of any odor uncharacteristic of coffee or suggestive of the source material.

SUMMARY OF THE INVENTION

In the course of experiments which I have made with a wide variety of vegetable materials which I have subdivided, roasted, and used just as ground coffee is used to brew a beverage, I have found that root of the common carrot (Daucus carota) when so treated produces a beverage closely simulating coffee. However, the characteristic odor of the carrot is prominent especially during brewing.

I have discovered that this characteristic odor can be eliminated by separating the central zone of "wood" or pith of the carrot root, which apparently contains the odoriforous material, from its outer zone or cortex and employing only the latter in subdivided and roasted form to brew, by the same procedures as coffee is brewed, a beverage which closely simulates coffee in color, taste and odor.

DESCRIPTION OF THE PREFERRED EMBODIMENT

I have made a coffee substitute according to my invention by initially preparing carrot roots of the long tapered variety having orange-colored flesh; removing their tops, peeling them, and removing the central zones of "wood" or pith, taking care not to leave any of it attached to the outer zone or cortex because I have found that the central zone apparently contains the material responsible for the characteristic carrot odor.

The outer zone or cortex is then subdivided, either finely or coarsely, as by grating or by paring into thin strips by means such as a potato peeler, thus adapting it for uniform and more rapid drying and roasting.

The subdivided material is then spread thinly on a metal sheet and subjected to roasting by heating it in an oven at about 425° F. for about 20 minutes or until it turns dark brown.

A beverage closely simulating coffee both in taste and odor, as well as color, was then brewed from this roasted material in a conventional percolator using the same proportions of dry material to water as would be used in brewing coffee.

While I have described a specific embodiment of my invention herein, it will be understood that modifications will occur to those familiar with the materials and procedures described and therefore that the scope of the invention is intended to be limited only as required by the prior art and the spirit of the appended claims.

I claim:

1. A material useful for brewing a beverage simulating coffee comprising the outer zone or cortex of carrot root subdivided and roasted to a dark brown colorand essentially devoid of the wood or pith of the core of the carrot root. color and 2. A material according to claim 1 in which such carrot root comprises a major portion of said material.

* * * * *